J. S. DRAPER.
AUTOMOBILE WHEEL.
APPLICATION FILED JUNE 20, 1910.
982,130.
Patented Jan. 17, 1911.
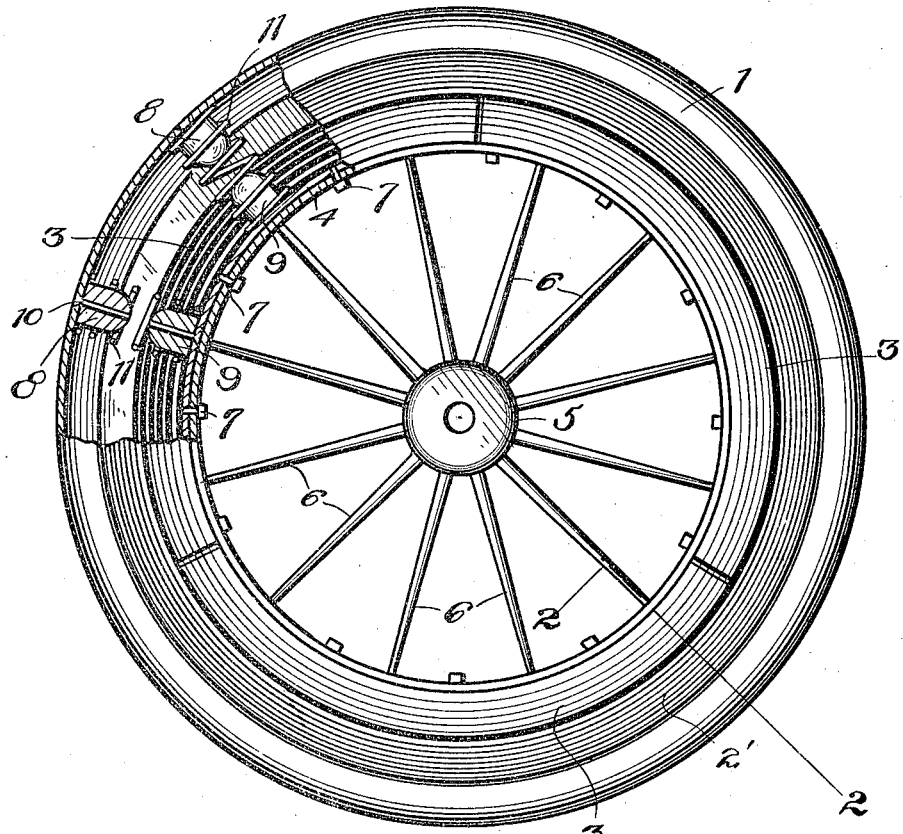
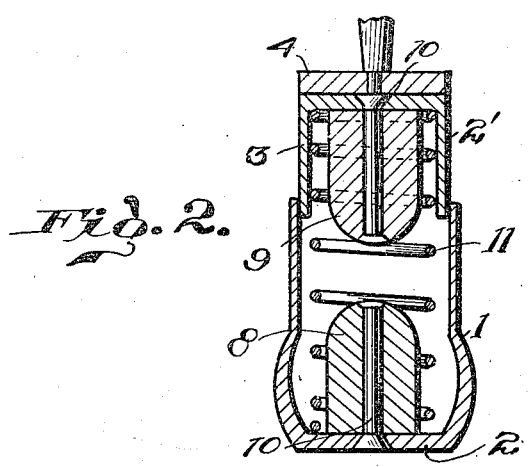
Witnesses
Inventor
James S Draper.
By E. E. Vrooman,
Attorney.

UNITED STATES PATENT OFFICE.

JAMES S. DRAPER, OF TEXARKANA, ARKANSAS.

AUTOMOBILE-WHEEL.

982,130.     Specification of Letters Patent.     Patented Jan. 17, 1911.

Application filed June 20, 1910. Serial No. 567,977.

*To all whom it may concern:*

Be it known that I, JAMES S. DRAPER, a citizen of the United States of America, residing at Texarkana, in the county of Miller and State of Arkansas, have invented certain new and useful Improvements in Automobile-Wheels, of which the following is a specification, reference being had therein to the accompanying drawing.

This invention relates to wheels for automobiles, and has especial reference to automobile wheels so constructed and arranged as to be resilient and to provide a cushioning effect whereby the automobile is relieved from jar and shock.

The invention has for its object to provide an improved resilient wheel for automobiles so constructed and arranged that the parts may be readily put together and taken apart and which will be effective in operation and will provide cushioning support for the tire of the wheel.

The invention consists in an improved automobile wheel and in details of construction thereof as hereinafter set forth and claimed.

Figure 1 is a view in side elevation of an automobile wheel shown as partly broken away and constructed in accordance with this invention. Fig. 2 is a detail view of a portion of the wheel in cross section on the line 2—2 of Fig. 1.

In carrying out the invention the periphery of the wheel is formed with an annular casing 1, the inner circumference of which is open, and the outer circumference of which forms the tread 2 of the wheel. In conjunction with the annular casing 1 there is provided a trough-shaped annular casing 2' which projects into the annular casing 1. In order that the annular casing 2' may be fitted into the annular casing 1, it is formed in sections 3 which are laid together end to end as they are inserted in the annular casing 1. After the sections 3 of the annular casing 2' have been inserted in the annular casing 1, the body portion of the wheel, consisting of the rim 4, the hub 5, and the spokes 6 connecting the rim with the hub is inserted inside of the annular casing 2', and the rim 4 is secured to the annular casing 2' by bolts 7.

In order to render the wheel resilient and to provide a cushioning effect for the tread, a series of projections 8 are mounted at intervals throughout the circumference of the casing 1 on the inner side of the tread portion 2 of the casing 1. A series of projections 9 similar to the projections 8 are mounted at intervals on the inner side of the annular casing 2' throughout its circumference, each of said projections 9 being opposite to and in alinement with one of the projections 8. The projections 8 and 9 are secured to the casings 1 and 2 by rivets 10 or in any other suitable manner. Extending over each pair of opposite projections 8 and 9 is a stout coil spring 11, one end of said spring bearing against the inner side of the casing 1, and the other end thereof bearing against the inner side of the casing 2'. As shown in Fig. 2, the casing 1 is much deeper than the casing 2', the latter slightly projecting into the casing 1. By means of this construction and arrangement, the casing 1 is permitted to have a slight telescoping movement upon the casing 2', as the springs 11 are compressed by the movements of the automobile.

It will be seen that by means of this construction a cushioning effect is provided for the entire periphery of the wheel, and will be regularly distributed throughout the circumference of the wheel. Furthermore, by means of this construction and arrangement of parts, should any of the parts become broken or out of order, the wheel can easily be taken apart and said broken parts removed and replaced by simply removing one of the sections of the casing 2' after the rim, spokes and hub of the wheel have been removed.

Having described the invention, I claim:

A spring wheel comprising an inner and an outer casing, one sliding upon the other, a plurality of pairs of projections within said casings, all of the projections of similar structure and each being provided with a flat face and with a rounded outer end, a fastening member extending longitudinally through the projection and having its outer end flattened and lying flush with the rounded face and the opposite end extending through the casing and lying flush against the outer surface thereof, and a helical spring embracing the projections in each pair and positively exerting an outward pressure upon the outer casing, substantially as shown and described.

In testimony whereof I hereunto affix my signature in presence of two witnesses.

JAMES S. DRAPER.

Witnesses:
  JOHN N. COOK,
  C. W. KIMBALL.